United States Patent [19]

Isogai et al.

[11] Patent Number: 4,467,750

[45] Date of Patent: Aug. 28, 1984

[54] FLOW CONTROL DEVICE OF A HELICALLY-SHAPED INTAKE PORT

[75] Inventors: Kiyoshi Isogai, Toyota; Ituo Koga, Okazaki; Yutaka Yamada, Hekinan; Kazumi Haruta, Kariya, all of Japan

[73] Assignees: Toyota Jidosha Kabushiki Kaisha; Aisan Industry Co., Ltd., both of Aichi, Japan

[21] Appl. No.: 407,615

[22] Filed: Aug. 12, 1982

[30] Foreign Application Priority Data

Nov. 4, 1981 [JP] Japan .................. 163722[U]

[51] Int. Cl.³ .......................................... F02B 31/00
[52] U.S. Cl. ................................. 123/188 M; 123/306
[58] Field of Search ............... 123/52 M, 188 M, 306, 123/308, 432

[56] References Cited

U.S. PATENT DOCUMENTS

| | | | |
|---|---|---|---|
| 3,850,479 | 11/1974 | Boyhont et al. | 302/29 |
| 4,174,686 | 11/1979 | Shimizu et al. | 123/188 M |
| 4,196,701 | 4/1980 | Tamura et al. | 123/188 M |
| 4,201,165 | 5/1980 | Tanaka et al. | 123/568 |
| 4,253,432 | 3/1981 | Nohira et al. | 123/52 M |
| 4,256,062 | 3/1981 | Schafer | 123/52 M |
| 4,257,384 | 3/1981 | Matsumoto | 123/575 |
| 4,312,309 | 1/1982 | Nakanishi et al. | 123/188 M |
| 4,411,226 | 10/1983 | Okumura et al. | 123/188 M |

FOREIGN PATENT DOCUMENTS

| | | |
|---|---|---|
| 2059008 | 6/1972 | Fed. Rep. of Germany . |
| 2308327 | 10/1973 | Fed. Rep. of Germany ... 123/188 M |
| 143289 | 8/1980 | German Democratic Rep. ................ 123/188 M |
| 127113 | 9/1977 | Japan ..................... 123/188 M |
| 58129 | 5/1979 | Japan . |
| 54922 | 5/1981 | Japan . |
| 68519 | 4/1982 | Japan . |

Primary Examiner—Craig R. Feinberg
Assistant Examiner—W. R. Wolfe
Attorney, Agent, or Firm—Parkhurst & Oliff

[57] ABSTRACT

A helically-shaped intake port comprising a helical portion formed around an intake valve, and a substantially straight inlet passage portion tangentially connected to the helical portion. A bypass passage is branched off from the inlet passage portion and connected to the helical portion. A rotary valve is arranged in the bypass passage and actuated by a vacuum operated diaphragm apparatus. The rotary valve is opened when the amount of air fed into the cylinder of an engine is increased beyond a predetermined value. The diaphragm apparatus comprises a diaphragm and a control rod interconnecting the diaphragm to the rotary valve. A first stop and a second stop, which are engageable with the housing of the diaphragm apparatus, are fixed onto the control rod for retaining the rotary valve at the full open position and at the completely closed position, respectively.

14 Claims, 12 Drawing Figures

FLOW CONTROL DEVICE OF A HELICALLY-SHAPED INTAKE PORT

BACKGROUND OF THE INVENTION

The present invention relates to a flow control device of a helically-shaped intake port of an internal combustion engine.

A helically-shaped intake port normally comprises a helical portion formed around the intake valve of an engine, and a substantially straight inlet passage portion tangentially connected to the helical portion. However, if such a helically-shaped intake port is so formed that a strong swirl motion is created in the combustion chamber of an engine when the engine is operating at a low speed under a light load, that is when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a flow control device in which a bypass passage, branched off from the inlet passage portion and connected to the helix terminating portion of the helical portion, is formed in the cylinder head of an engine. A normally closed type flow control valve, actuated by an actuator, is arranged in the bypass passage and opened under the operation of the actuator when the amount of air fed into the cylinder of the engine is larger than a predetermined amount. In this flow control device, when the amount of air fed into the cylinder of the engine is large, that is, when the engine is operating under a heavy load at a high speed, a part of the air introduced into the inlet passage portion is fed into the helical portion of the helically-shaped intake port via the bypass passage. This reduces the flow resistance of the helically-shaped intake port enabling high volumetric efficiency. However, in such a flow control device, in order to actually obtain a high volumetric efficiency and create a strong swirl motion, it is necessary to retain the flow control valve precisely at the full open position and at the completely closed position. Nevertheless, this flow control device is just the embodiment of the basic principle of operation and thus is not constructed so that the flow control valve can be retained precisely at the fully open position and the completely closed position. Therefore, in the flow control device, it is difficult to actually obtain a high volumetric efficiency and create a strong swirl motion.

SUMMARY OF THE INVENTION

An object of the present invention is to provide a flow control device capable of actually obtaining a high volumetric efficiency and creating a strong swirl motion by retaining the flow control valve precisely at the full open position and at the completely closed position.

According to the present invention, there is provided a device for controlling the flow in a helically-shaped intake port of an internal combustion engine having an intake passage which is connected to said intake port, said intake port comprising a helical portion formed around an intake valve, and a substantially straight inlet passage portion tangentially connected to the helical portion and having a helix terminating portion, said device comprising: a bypass passage branched off from the inlet passage portion and connected to the helix terminating portion of the helical portion; normally closed valve means arranged in said bypass passage for controlling the flow area of said bypass passage; a vacuum operated diaphragm apparatus having a housing, a vacuum chamber formed in said housing, a diaphragm separating said vacuum chamber from the atmosphere and actuated in response to a change in the level of vacuum produced in said vacuum chamber, a control rod interconnecting said diaphragm to said valve means, a first stop fixed onto said control rod and being engageable with said housing for retaining said valve means at the full open position, and a second stop fixed onto said control rod and being engageable with said housing for retaining said valve means at the completely closed position; and control means selectively connecting said vacuum chamber to the atmosphere or said intake passage in response to a change in the amount of air fed into said intake passage for retaining said valve means at the full open position or at the completely closed position when said amount of air is larger or smaller than a predetermined level, respectively.

The present invention may be more fully understood from the description of preferred embodiments of the invention set forth below, together with the accompanying drawings.

DESCRIPTION OF A PREFERRED EMBODIMENT

Figure 1:
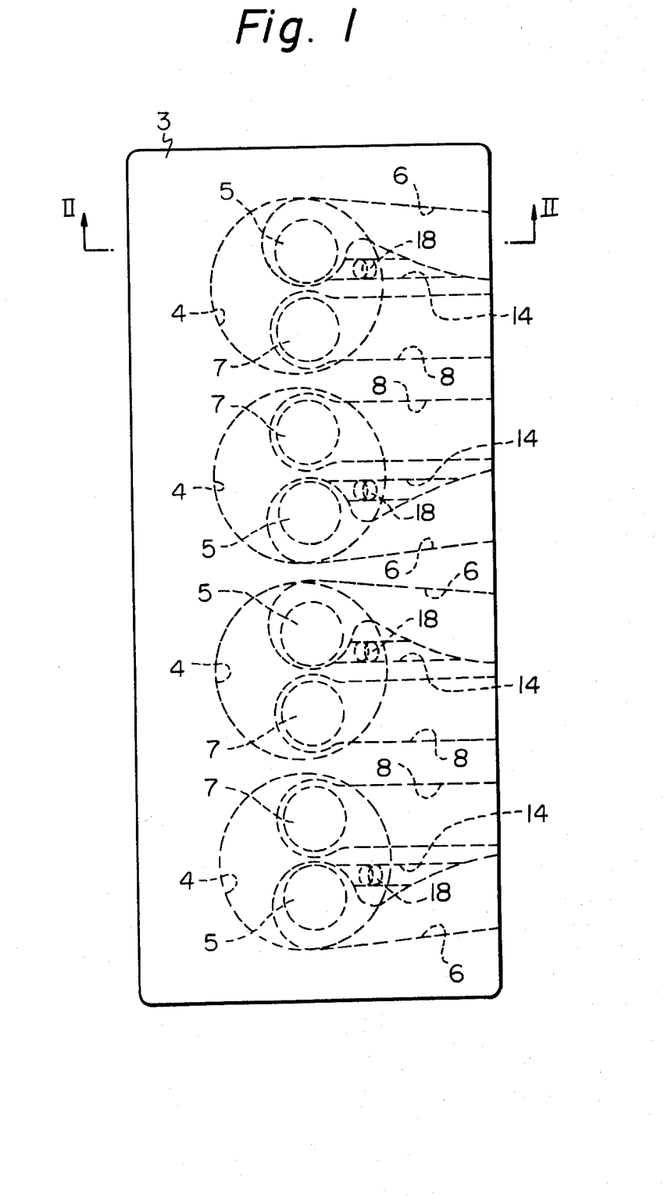
FIG. 1 is a plan view of an internal combustion engine according to the present invention.
Figure 2:
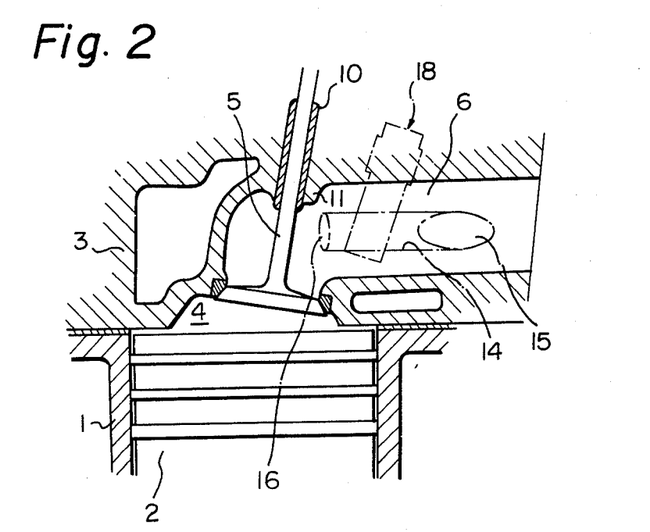
FIG. 2 is a cross-sectional view taken along the line II—II in FIG. 1.

Referring to FIGS. 1 and 2, 1 reference numeral designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, and 8 an exhaust port formed in the cylinder head 3. A spark plug (not shown) is arranged in the combustion chamber 4.

Figure 3:
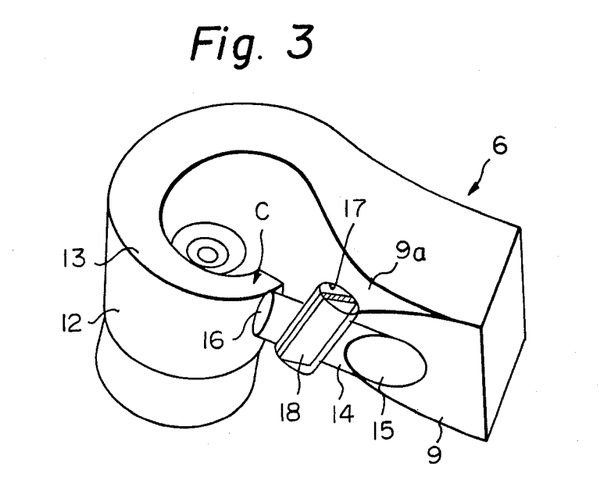
FIG. 3 is a perspective view schematically illustrating the shape of a helically shaped-intake port.
Figure 4:
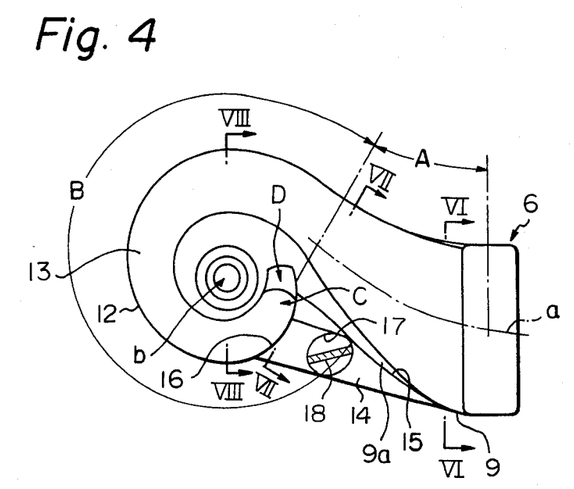
FIG. 4 is a plan view of FIG. 3.
Figure 5:
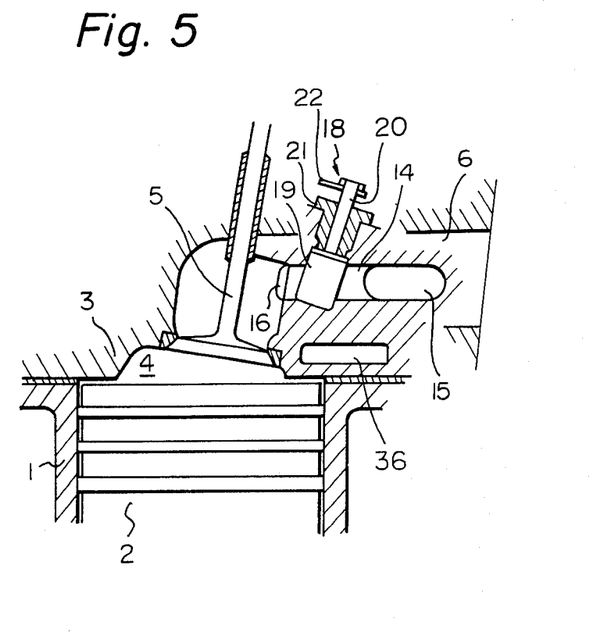
FIG. 5 is a cross-sectional view taken along the bypass passage in FIG. 3.
Figure 6:
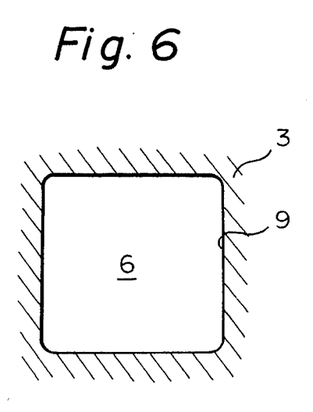
FIG. 6 is a cross-sectional view taken along the line VI—VI in FIG. 4.
Figure 7:
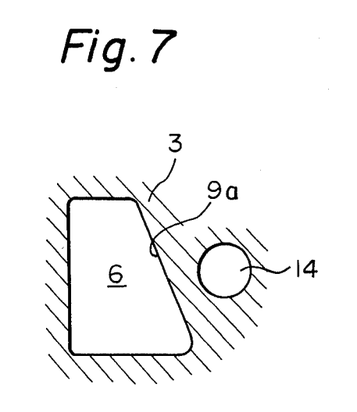
FIG. 7 is a cross-sectional view taken along the line VIII—VIII in FIG. 4.
Figure 8:
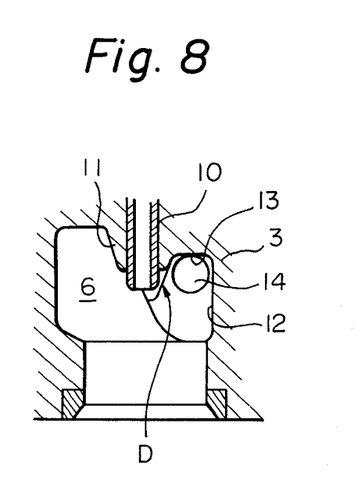
FIG. 8 is a cross-sectional view taken along the line VIII—VIII in FIG. 4.

FIGS. 3 through 5 schematically illustrate the shape of the helically-shaped intake port 6 illustrated in FIG. 2. As illustrated in FIG. 4, the helically-shaped intake port 6 comprises an inlet passage portion A the longitudinal central axis of which is slightly curved, and a helical portion B formed around the valve stem of the intake valve 5. The inlet passage portion A is tangentially connected to the helical portion B. As illustrated in FIGS. 3, 4 and 7, the side wall 9 of the inlet passage portion A, which is located near the helix axis b, has on its upper portion as inclined wall portion 9a which is arranged to be directed downwards. The width of the inclined wall portion 9a is gradually increased towards the helical portion B, and as is illustrated in FIG. 7, the entire portion of the side wall 9 is inclined at the connecting portion of the inlet passage portion A and the helical portion B. The upper half of the side wall 9 is smoothly connected to the circumferential wall of a cylindrical projection 11 (FIG. 2) which is formed on the upper wall of the intake port 6 at a position located around a valve guide 10 of the intake valve 5. The lower half of the side wall 9 is connected to the side wall 12 of the helical portion B at the helix terminating portion C of the helical portion B.

Figure 9:
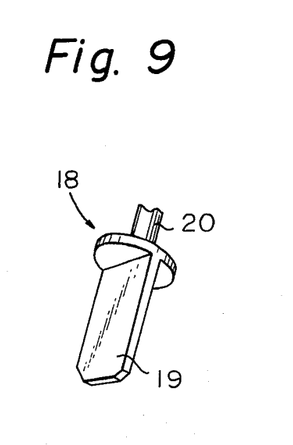
FIG. 9 is a perspective view of a rotary valve.

As illustrated in FIGS. 1 through 5, bypass passages 14, branched off the inlet passage portions A of the corresponding intake ports 6 and having a substantially uniform cross-section, are formed in the cylinder head 3, and each of the bypass passages 14 is connected to the helix terminating portion C of the corresponding intake port 6. Each of the inlet openings 15 of the bypass passages 14 is formed on the side wall 9 at a position located near the inlet open end of the inlet passage portion A of the corresponding intake port 6, and each of the outlet openings 16 of the bypass passages 14 is formed on the upper end portion of the side wall 12 at the helix terminating portion C of the corresponding intake port 6. In addition, valve insertion bores 17, extending across the corresponding bypass passages 14, are formed in the cylinder head 3, and rotary valves 18, each functioning as a flow control valve, are inserted into the corresponding valve insertion bores 17. The rotary valves 18 are inserted into the corresponding bypass passages 14, and as illustrated in FIG. 9, each of the rotary valves 18 comprises a thin plate-shaped valve body 19, and a valve shaft 20 formed in one piece on the valve body 19. The valve shaft 20 is rotatably supported by a guide sleeve 21 fitted into the valve insertion bore 17. The valve shaft 20 projects upwardly from the top face of the guide sleeve 21, and an arm 22 is fixed onto the projecting tip portion of the valve shaft 20.

Figure 10:
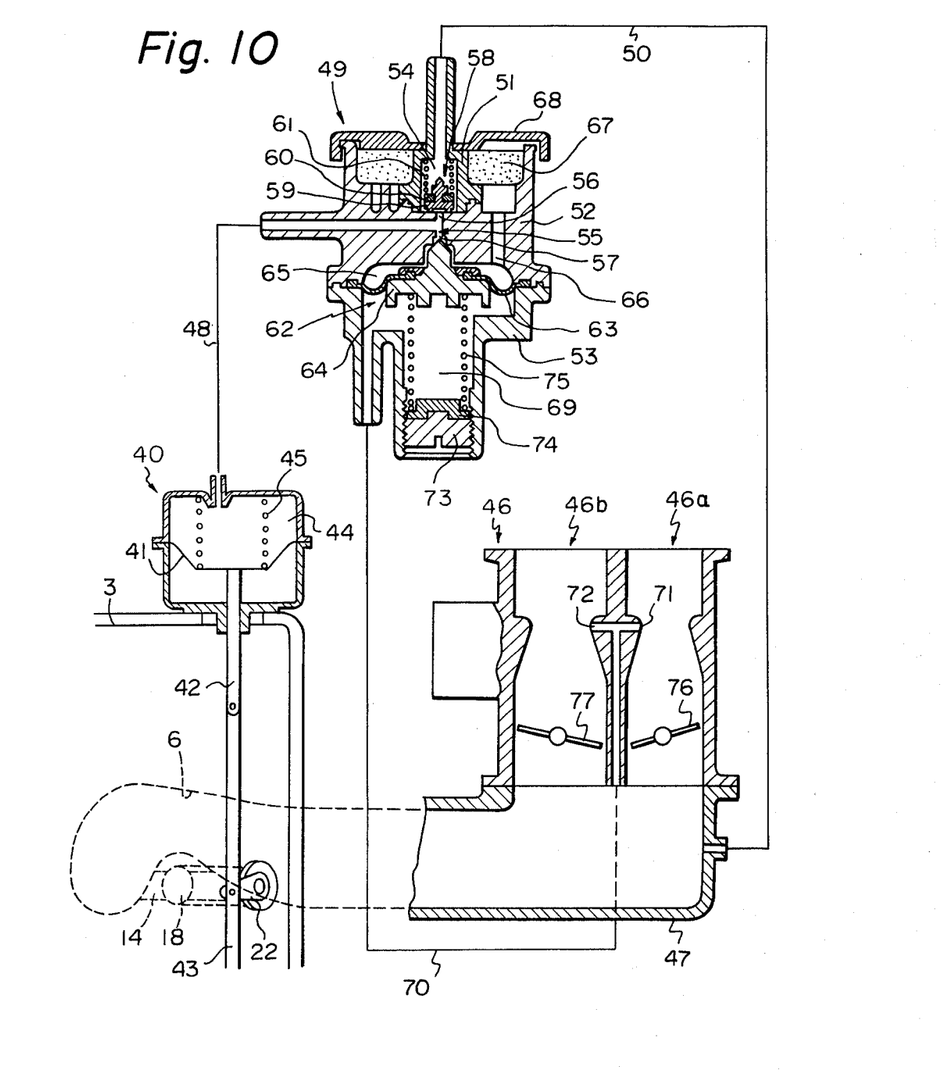
FIG. 10 is a view illustrating the entirety of a flow control valve.

Referring to FIG. 10, the tip of the arm 22 fixed onto the top end of the valve shaft 20 is connected via a connecting rod 43 to a control rod 42 which is fixed onto a diaphragm 41 of a vacuum operated diaphragm apparatus 40. The diaphragm apparatus 40 comprises a vacuum chamber 44 separated from the atmosphere by the diaphragm 41, and a compression spring 45 for biasing the diaphragm 41 is inserted into the vacuum chamber 44.

An intake manifold 47, equipped with a compound type carburetor 46 comprising a primary carburetor 46a and a secondary carburetor 46b, is mounted on the cylinder head 3, and the vacuum chamber 44 is connected to the interior of the intake manifold 47 via a vacuum conduit 48, a vacuum control valve device 49 and a vacuum conduit 50. As illustrated in FIG. 10, the vacuum control valve device 49 comprises three housings, that is, a first housing 51, a second housing 52 and a third housing 53 which are interconnected to each other by using, for example, an ultra sonic welding. A vacuum introduction chamber 54 is formed in the first housing 51 and connected to the interior of the intake manifold 47 via the vacuum conduit 50. An interior passage 55, extending on the axis of the vacuum control valve device 49, is formed in the second housing 52 and has a vacuum port 56 and an atmosphere port 57 at the opposite ends thereof. The interior passage 55, connected to both the atmosphere port 57 and the vacuum port 56, is connected to the vacuum chamber 44 of the diaphragm apparatus 40.

A check valve 58 for controlling the opening operation of the vacuum port 56 is inserted into the vacuum introduction chamber 54 formed in the first housing 51. The check valve 58 comprises a valve body 59 for closing the vacuum port 56, a spring retainer 60 supported by the valve body 59, and a compression spring 61 inserted between the spring retainer 60 and the upper wall of the vacuum introduction chamber 54 for basing the valve body 59 towards the vacuum port 56. An air valve 62 is integrally assembled to the vacuum control valve device 49 and has a diaphragm 63. A valve 64 for controlling the opening operation of the atmosphere port 57 is fixed onto the central portion of the diaphragm 63, and the peripheral edge portion of the diaphragm 63 is held between the second housing 52 and the third housing 53. An atmospheric pressure chamber 65 is formed between the diaphragm 63 and the second housing 52 and is open to the atmosphere via an air introduction bore 66 formed in the second housing 52 and via an air filter 67. The air filter 67 is supported by a cap 68 fitted onto the second housing 52. A vacuum chamber 69 is formed between the diaphragm 63 and the third housing 53 and connected via a vacuum conduit 70 to vaccum ports 71 and 72 which are open to the venturi portions of the primary carburetor 46a and the secondary carburetor 46b, respectively. An adjusting screw 73 is screwed into the lower end portion of the third housing 53, and a compression spring 75 is inserted between the valve body 64 of the diaphragm 63 and a spring retainer 74 fitted onto the top of the adjusting screw 73 for biasing the valve body 64 towards the atmosphere port 57.

The carburetor 46 is a conventional carburetor. Consequently, when the opening degree of a primary throttle valve 76 is increased beyond a predetermined degree, a secondary throttle valve 77 is opened. When the primary throttle valve 76 is fully opened, the secondary throttle valve 77 is also fully opened. The level of vacuum acting on the vacuum conduit 70 connected to the vacuum ports 71, 72 is increased as the amount of air fed into the cylinders of the engine is increased. Consequently, when the engine is operating at a high speed under a heavy load, that is, when the level of vacuum acting on the vacuum conduit 70 becomes greater than a predetermined level, the diaphragm 63 of the air valve 62 moves downward in FIG. 10 against the compression spring 75. As a result of this, the valve body 64 opens the atmosphere port 57. Thus, the vacuum chamber 44 of the diaphragm apparatus 40 becomes open to the atmosphere. At this time, the diaphragm 41 moves downward in FIG. 10 due to the spring force of the compression spring 45. Thus, the rotary valve 18 is rotated and fully opens the bypass passage 14.

On the other hand, in the case wherein the opening degree of the primary throttle valve 76 is small, since the level of vacuum acting on the vacuum conduit 70 is small, the diaphragm 63 of the air valve 62 moves upward in FIG. 10 due to the spring force of the compression spring 75. As a result, the valve body 64 closes the atmosphere port 57. In addition, in the case wherein the opening degree of the primary throttle valve 76 is small, a great vacuum is produced in the intake manifold 47. Since the check valve 58 opens when the level of vacuum produced in the intake manifold 47 becomes greater than that of the vacuum produced in the vacuum chamber 44, and since the check valve 58 closes when the level of the vacuum produced in the intake manifold 47 becomes smaller than that of the vacuum produced in the vacuum chamber 44, the level of the vacuum in the vacuum chamber 44 is maintained at the maximum vacuum which has been produced in the intake manifold 47 as long as the air valve 51 remains closed. If a vacuum is produced in the vacuum chamber 44, the diaphragm 41 moves upward in FIG. 10 against the compression spring 45. As a result, the rotary valve 18 is rotated and closes the bypass passage 14. Consequently, when the engine is operating at a low speed under a light load, the bypass passage 14 is closed by the rotary valve 18. In the case wherein the engine speed is low even if the engine is operating under a heavy load, and in the case wherein the engine is operating under a light load even if the engine speed is high, since the vacuum acting on the vacuum conduit 70 is small, the air valve 62 remains closed. Consequently, when the engine is operating at a low speed under a heavy load and at a high speed under a light load, since the level of the vacuum in the vacuum chamber 44 is maintained at the above-mentioned maximum vacuum, the bypass passage 14 is closed by the rotary valve 18.

Figure 11:
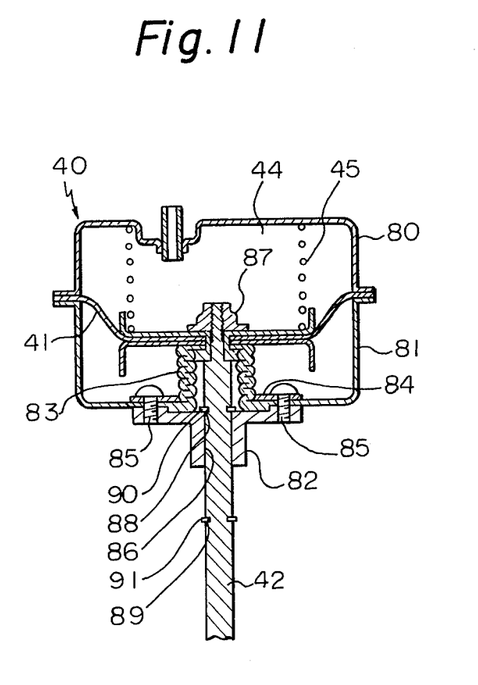
FIG. 11 is a cross-sectional side view of the vacuum operated diaphragm apparatus schematically illustrated in FIG. 10.
Figure 12:
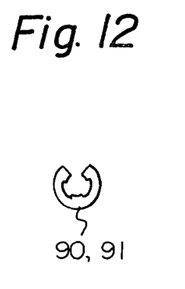
FIG. 12 is a plan view of an E-shaped ring.

FIG. 11 illustrates the cross-sectional view of the vacuum operated diaphragm apparatus 40 schematically illustrated in FIG. 10. As illustrated in FIG. 11, the diaphragm apparatus 40 comprises a pair of housings 80 and 81, and a bearing member 82 is fixed onto the central portion of the outer wall of the housing 81. The bearing member 82 is fixed onto the housing 81 by means of bolts 85 together with an annular ring 84 supporting the end portion of a bellows 83. A cylindrical bore 86 is formed in the bearing member 82, and the control rod 42 extends through the cylindrical bore 86. The control rod 42 is fixed onto the diaphragm 41 by means of a nut 87 together with the end portion of the bellows 83. A pair of circumferential grooves 88 and 89 is formed on the outer circumferential wall of the control rod 42 located on each side of the bearing member 82, and E-shaped rings 90 and 91, as illustrated in FIG. 12, are fitted into the circumferential grooves 88 and 89, respectively. The E-shaped ring 90 functions a stop abutting against the inner end face of the bearing member 82 and determining the maximum advancing position of the control rod 42, and the E-shaped ring 90 functions as a stop abutting against the outer end face of the bearing member 82 and determining the maximum retracted position of the control rod 42. The E-shaped ring 90 is arranged precisely at a position where the rotary valve 18 opens the bypass passage 14 to the maximum extent when the E-shaped ring 90 comes into engagement with the bearing member 82, and the E-shaped ring 91 is arranged precisely at a position where the rotary valve 18 completely closes the bypass passage 14 when the E-shaped ring 91 comes into engagement with the bearing member 82. Since the circumferential grooves 88 and 89 are formed by machining operation, it is possible to precisely position the E-shaped at predetermined places.

As mentioned above, when the engine is operating at a low speed under a light load, that is, when the amount of air fed into the cylinder of the engine is small, the rotary valve 18 closes the bypass passage 14. At this time, the mixture introduced into the inlet passage portion A moves downward, while swirling, along the upper wall 13 of the helical portion B. Then, since the mixture, while swirling, flows into the combustion chamber 4, a strong swirl motion is created in the combustion chamber 4.

When the engine is operating at a high speed under a heavy load, that is, when the amount of air fed into the cylinder of the engine is large, since the rotary valve 18 opens the bypass passage 14, a part of the mixture introduced into the inlet pasage portion A is fed into the helical portion B via the bypass passage 14 having a low flow resistance. Then, this part of the mixture collides head-on against the mixture stream flowing along the upper wall 13 of the helcial portion B. As a result of this, since the mixture stream flowing along the upper wall 13 of the helical portion B is decelerated, a swirl motion is weakened. As mentioned above, when the engine is operating at a high speed under a heavy load, since the rotary valve 18 opens, the entire flow area of the intake port 6 is increased, and a swirl motion is weakened, it is possible to obtain a high volumetric efficiency. In addition, by forming the inclined wall portion 9a, the flow direction of a part of the mixture introduced into the inlet passage portion A is deflected downward. As a result of this, since the part of the mixture flows into the helical portion B along the bottom wall of the intake port 6 without swirling, the flow resistance of the intake port 6 beocmes small, making it possible to further increase a volumetric efficiency when the engine is operating at a high speed under a heavy load.

According to the present invention, by attaching a pair of the E-shaped rings to the control rod of the diaphragm apparatus, it is possible to retain the rotary valve precisely at the full open position and the completely closed position. As a result of this, when the amount of air fed into the cylinders of the engine is small, since the entire fuel mixture is fed into the helical portion from the inlet passage portion, it is possible to create a strong swirl motion. In addition, when the amount of air fed into the cylinders of the engine is large, since a flow resistance of the bypass passage is minimized, it is possible to obtain a high volumetric efficiency.

While the invention has been described with reference to a specific embodiment chosen for the purpose of illustration, it should be apparent that numerous modifications can be made thereto by those skilled in the art without departing from the spirit and scope of the invention.

We claim:

1. A device for controlling flow in a helically-shaped intake port of an internal combustion engine having an intake passage which is connected to said intake port, said intake port comprising a helical portion formed around an intake valve, and a substantially straight inlet passage portion tangentially connected to the helical portion and having a helix terminating portion, said device comprising:

a bypass passage branched off from the inlet passage portion and connected to the helix terminating portion of the helical portion;

normally closed valve means arranged in said bypass passage for controlling a flow area of said bypass passage;

a vacuum operated diaphragm apparatus having a housing, a vacuum chamber formed in said housing, a diaphragm separating said vacuum chamber from the atmosphere and actuated in response to a change in the level of vacuum produced in said vacuum chamber, a control rod interconnecting said diaphragm to said valve means, a first stop fixed onto said control rod and being engageable with said housing for retaining said valve means at a full open position, and a second stop fixed onto said control rod and being engageable with said housing for retaining said valve means at the completely closed position; and control means selectively connecting said vacuum chamber to the atmosphere or said intake passage in response to a change in the amount of air fed into said intake passage for retaining said valve means at the full open position or at the completely closed position when said amount of air is larger or smaller than a predetermined level, respectively.

2. A device according to claim 1, wherein said bypass passage has an outlet opening which is open to the helical portion at a position near a top wall of the helical portion.

3. A device according to claim 1, wherein said control rod has an outer circumferential wall having a pair of circumferential grooves formed thereon, said first stop and said second stop being rings which are fitted into said corresponding circumferential grooves.

4. A device according to claim 1, wherein said diaphragm apparatus comprises a bearing member fixed onto said housing and having therein a cylindrical bore through which said control rod extends, said first stop and said second stop being arranged to be engageable with said bearing member for retaining said valve means at the full open position and at the completely closed position, respectively.

5. A device according to claim 1, wherein said valve means comprises a rotary valve rotatably arranged in said bypass passage.

6. A device according to claim 5, wherein said rotary valve comprises a thin plate-shaped valve body extending through said bypass passage.

7. A device according to claim 1, wherein the intake passage portion has an inlet open end located furthest from the helical portion, said bypass passage having an inlet opening which is open to the inlet passage portion at a position near said inlet open end.

8. A device according to claim 7, wherein the intake passage portion comprises an upper wall, a bottom wall, a first side wall located near the intake valve and a second side wall located remote from the intake valve, said first side wall comprising a downwardly inclined portion located near the helical portion, and a substantially vertical portion located near said inlet open end, the inlet opening of said bypass passage being formed on said vertical portion.

9. A device according to claim 8, wherein the intake port comprises a valve guide projecting into the helical portion from an upper wall of the helical portion and having a circumferential wall, said downwardly inclined portion being tangentially connected to the circumferential wall of said valve guide.

10. A device according to claim 1, wherein said control means is connected to said vacuum chamber for maintaining the level of the vacuum in said vacuum chamber at the maximum vaccum which has been produced in the intake passage when the amount of air fed into the intake passage is smaller than said predetermined value and connecting said vacuum chamber to the atmosphere when said amount of air is larger than said predetermined value.

11. A device according to claim 10, wherein said control apparatus comprises a check valve arranged between the intake passage and said vacuum chamber for allowing only the outflow of air from said vacuum chamber, and an air valve for controlling a fluid connection between said vacuum chamber and the atmosphere to connect said vacuum chamber to the atmosphere when said amount of air is larger than said predetermined value.

12. A device according to claim 11, wherein the engine comprises a carburetor connected to the intake passage and having a venturi portion, said air valve being actuated in response to a change in the level of the vacuum produced in said venturi portion.

13. A device according to claim 12, wherein said air valve comprises a valve body for controlling the fluid connection between said vacuum chamber and the atmosphere, a vacuum cavity connected to said venturi portion, and a diaphragm connected to said valve body and actuated in response to a change in the level of the vacuum produced in said vacuum cavity.

14. A device according to claim 13, wherein said carburetor comprises a primary caburetor having a venturi portion, and a secondary carburetor having a venturi portion, said vacuum cavity being connected to both said venturi portions.

* * * * *